June 27, 1944.  G. F. WALES  2,352,297

BOLT

Filed July 3, 1940

INVENTOR.
George F. Wales
By Parker, Rockwow & Farmer.
ATTORNEYS.

Patented June 27, 1944

2,352,297

UNITED STATES PATENT OFFICE 2,352,297

BOLT

George F. Wales, Kenmore, N. Y.

Application July 3, 1940, Serial No. 343,813

4 Claims. (Cl. 85—1)

This invention relates to improvements in screws or bolts of the type commonly employed in conjunction with plates having retainer grooves of substantially T-shaped cross section, which bolts are sometimes referred to as "T-bolts."

Bolts of this kind have heretofore been made of one piece with the heads and shanks integral, and usually the heads are of square shape so as to fit into the enlarged undercut portion of a T-groove in a plate, while the shank of the bolt extends through the narrow portion of the groove or slot. The head is of sufficient size to retain the bolt against movement out of the slot in the direction of the length of the bolt and also to prevent turning of the bolt. A bolt of this character must obviously enter the T-groove from the end of the plate or through openings which may be cut at intervals to allow for the insertion of the bolt head into the T-groove. Such T-slotted plates have many uses and are frequently employed in connection with machine tools, such as milling machines, presses, drills, shapers, planers and the like, and it is common machine shop practice to clamp holding devices for tools or the work to be operated on to such plates. For example, in my Patent No. 1,955,866, I show adjustable sheet metal perforating dies mounted on a T-slotted plate of a press.

The use of one-piece bolts on T-slotted plates has several disadvantages. In the first place, when such plates are used on machine tools, the upper ends of the slots are generally open, so that material which is cut from the work drops into these slots. This makes it necessary to spend considerable time to remove this accumulated material from the slots before the bolts can be slid into or out of the slots. Another disadvantage is that when a number of individual units are attached to a T-slotted plate, no other unit can be positioned between them unless one or more of the attached units are removed and bolts are slid into the new position, whereupon the latter units must again be secured to the plate in correct positions.

It has been heretofore attempted to overcome these difficulties by providing bolts with heads of the width of the body or shank of the bolt in one direction and of slightly greater length than the width of the undercut or larger portion of the T-groove in the plate. The head of a bolt of this kind can be inserted through the narrow part of the groove while extending lengthwise thereof, and by turning the bolt in the direction required for tightening the nut on the opposite end thereof, the head takes a position in the undercut part of the T-groove, which prevents movement of the same upwardly out of the groove. Bolts of this type, however, have been found not to be serviceable for the reason that the heads thereof are so narrow that they have materially less strength to resist the pressure applied thereto when the parts are securely clamped in place, so that they will not move while in operation. Consequently, these heads have materially smaller areas of contact in the grooves, which results in deformation and damage to the heads and to the plate, or in breaking of the heads of the bolts.

One of the objects of this invention is to provide a bolt of this type, of simple and efficient construction and which is split lengthwise into two parts, both of which can be separately inserted through the narrow portion of a T-slot, and in which the heads are of sufficient size and strength to withstand the severe strains to which bolts of this type are subjected.

Another object of this invention is to provide a bolt of this type with a reinforced head of improved construction.

A further object is to provide a bolt of this kind in which the two parts of the bolt serve to securely hold the nut in place.

Another object is to provide a bolt of this type with means of improved construction for permanently locking the nut on the bolt.

It is also an object of this invention to provide an improved method of securing a bolt of this kind to a T-slotted plate.

Other objects of this invention will appear from the following description and claims.

Figure 1:
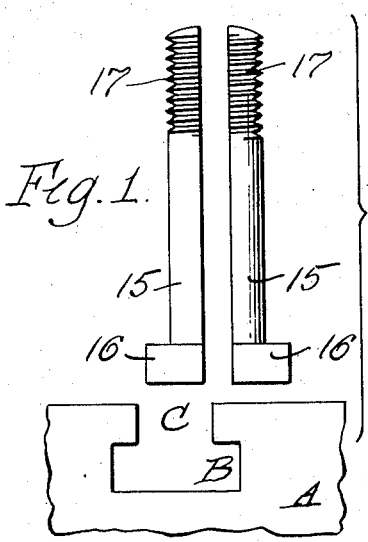
Fig. 1 is an elevation of a bolt embodying this invention and shows a portion of a T-slotted plate with which the bolt may cooperate.

In the drawing, A represents a plate having one or more T-shaped grooves or slots formed therein, each slot having an undercut, relatively wide portion 8, and a narrow portion C which terminates at the surface of the plate. While bolts embodying my invention are herein described as used in connection with the T-slots or grooves of plates, it will, nevertheless, be understood that it is not intended to limit the bolts to such use since my improved bolts may obviously be used for any other purpose for which they are suited.

Figure 2:
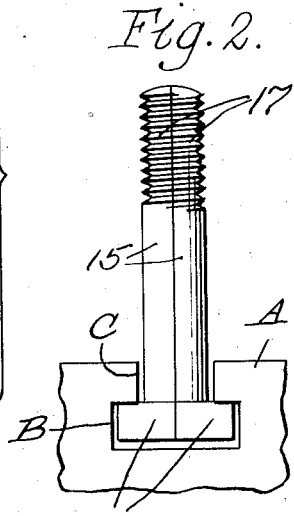
Fig. 2 is a similar elevation showing the parts of the bolt in their operative positions on the plate.
Figure 3:
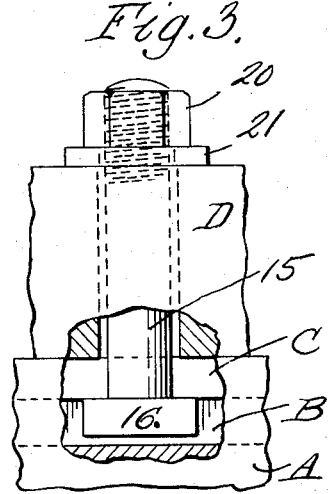
Fig. 3 is an elevation, partly in section, looking crosswise of the slot in the plate and showing an article clamped to the plate by means of the bolt.
Figure 4:
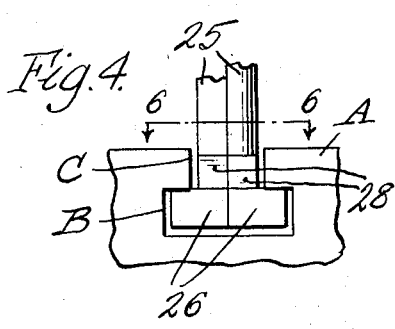
Fig. 4 is a fragmentary elevation of a bolt of modified construction showing the same positioned in a slot.

The bolts shown in Figs. 1 to 3 of the drawing are split or divided lengthwise into two parts or halves, each part including a half shank portion 15 and a half head portion 16 at one end thereof. The heads of the complete bolts are preferably square in cross section, but it will be obvious that the heads may be of any other polygonal cross sectional shape, so that when positioned in a slot or groove, they will be held against turning. The other ends of the two half bolts are provided with screw threads 17 for cooperation with the nut.

Longitudinally split bolts have heretofore been provided for other purposes, and in such cases, the heads of the bolts are generally made of some special shape or form of materially reduced size. In view of the severe strains to which the bolts used in connection with T-grooved plates are subjected, I have provided my improved bolt with a head of standard size and dimensions, so that my improved bolt differs from single piece bolts heretofore used in connection with T-grooves only in that it is longitudinally split. While I prefer to have the bolt split into two equal halves, yet it will be obvious that the two parts of the bolt may be of somewhat different sizes and, if desired, the split may extend only through the head and an adjacent part of the shank.

As a result of the construction described, the two halves of the bolt may, when separated, be easily applied to a T-shaped groove by passing each head portion separately through the narrow part C of the groove and then moving the two halves into registration with each other as shown in Fig. 2. The bolt may then be used in the same manner as a single piece bolt for securing a part D, such for example as a holding device for the work or for a tool, to the plate A.

The two parts of the bolt may be formed in any suitable or desired manner. For example, each part of the bolt may be made from half round steel of the size required for the shank portion 15 of the half bolt, and the head 16 may be formed in the usual manner by upsetting one end of the blank. The threads 17 may be cut or rolled or they may be pressed into the metal either while the same is hot or cold, by means of a suitable die. If a double lead thread is used, the two parts of the bolt may be identical. If the usual single lead thread is used, and it is desired to distribute the strain equally on the two halves of the bolt, the threads on the two half bolts must be spaced differently, so that the distance of the thread from the head on one half bolt differs from the corresponding distance on the other half bolt by one half of the pitch of the thread. Consequently, when the two bolts are placed together in their operative positions, the thread on one half of the bolt supplements the thread on the other half and when a nut is applied to a thread in this manner and tightened, the two halves of the head 16 of the bolt will both engage the under face of the shoulder overhanging the wide portion B of the T-slot in the plate A, so that the bolt thus constructed will have approximately the same strength as a single piece bolt. By means of the construction described, it will be noted that the upper surfaces of the head engaging against the shoulders of the T-slot are of the same area as those in a single piece bolt, so that by tightening the bolt in place, no damage results to the head of the bolt nor to the plate A.

20, Fig. 3, represents a nut used on the two halves of the bolt and 21 is a washer which may be placed between the nut 20 and the part D.

Figure 5:
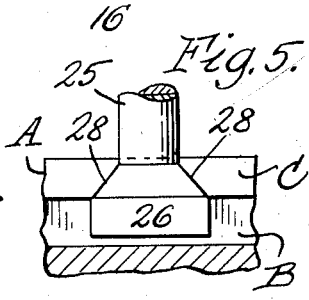
Fig. 5 is a fragmentary elevation thereof showing another side of the bolt and showing the grooved plate partly in section.
Figure 6:
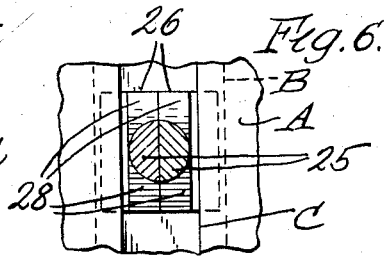
Fig. 6 is a sectional plan view thereof, on line 6—6, Fig. 4.

In the bolt shown in Figs. 4 to 6, 25 represents the shank of the bolt and 26 the head thereof, the bolt also being split lengthwise into two substantially equal halves. In this construction, a reinforcing web or connection is provided at the juncture of the shank with the head. Preferably, this reinforcing portion 28 is in the form of a flaring enlargement of the shank portion 25 of each part of the bolt, and these reinforcing webs or extensions project from opposite sides of the shank adjacent to and substantially parallel to the flat portion or face thereof. This reinforcing web may, in the construction shown, be of approximately the same thickness as the half shank 25 and may extend throughout the length of the head, as shown in Fig. 5. A reinforcing web of less thickness and other proportions may, however, be employed. The reinforcing web 28 in addition to adding greatly to the strength of the head of the bolt and increasing resistance of the head to deformation or breaking, serves the further purpose of extending into the narrow portion C of the slot in the plate and thus preventing turning of the bolt. In the construction shown in Figs. 4 to 6, I have shown the reinforcing web as extending from both sides of the shank 25 and also as formed on both parts of the bolt, but it will be obvious that, if desired, the reinforcement may be employed on one part only of the bolt, or may extend from one side or edge only of one or both halves of the shank. When a reinforcing web of this kind is employed, the head 26 of the bolt need not be of square or polygonal shape, since it need not be depended upon to hold the bolt against turning.

Figure 7:
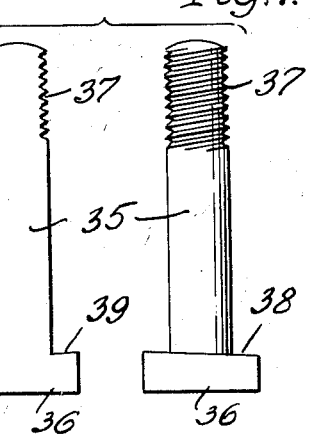
Fig. 7 is an elevation of two halves of a bolt of another modified construction, the two parts being spaced from each other.
Figure 8:
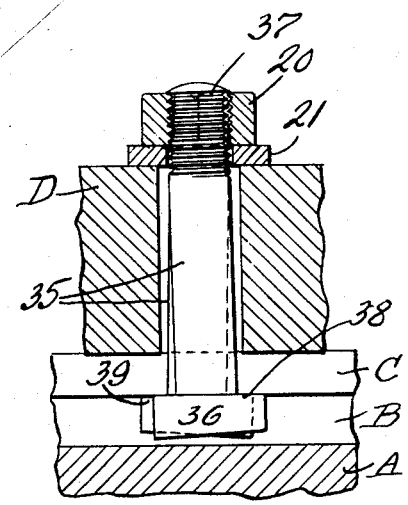
Fig. 8 is an elevation of the two halves of the bolt shown in Fig. 7 in operative positions and showing in section the plate, the article and a nut and washer.

In Figs. 7 and 8, I have shown a bolt of slightly modified construction which will tend to grip the nut used therewith so as to resist accidental loosening or removal of the nut. In these bolts, the shanks 35 and threaded portions 37 may be of the same form as those shown in connection with Figs. 1 to 6 and the heads 36 of the two half portions of the bolt may be of square or other polygonal cross sectional shape. The inner faces 38 and 39 of the heads of the two half bolts which are nearest to the shank portions 35 are, however, slightly inclined or tapered as shown, in such manner that these inner faces of the two parts of the bolt, when the parts are in operative relation to each other, are inclined in opposite directions. Consequently, when the two halves of the bolt are applied to a T-slot in the plate A and pressure is applied thereto by means of a nut 20 to secure an article D on the plate A, the inclined faces 38 and 39 of the two halves of the bolt will tend to occupy approximately the positions shown in Fig. 8 in order to seat themselves squarely on the under face of the shoulder of the T-slot or groove in the plate, and this will cause the threaded upper ends of the two half bolts to move slightly in opposite directions, thus producing a binding or seizing action on the nut which will act to secure or lock the nut firmly in place on the bolt, and thus resist accidental or unintended unscrewing of the nut.

The thread 37 of this bolt as shown is a double lead thread and when provided with a thread of this type, the two halves of the bolt may be identical. A double lead thread may, of course, be used in any of the other bolts shown in the drawing, and if preferred, a single lead thread may be used on the bolt shown in Figs. 7 and 8.

Figure 9:
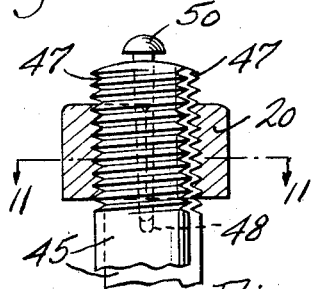
Fig. 9 is a fragmentary view of the upper portion of a bolt of still another modified form, and showing in section the nut for the bolt.
Figure 10:
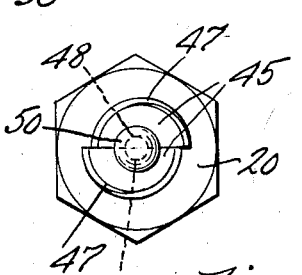
Fig. 10 is a top plan view of the bolt and nut shown in Fig. 9.

In Figs. 9 and 10, I have shown means for locking a nut on a bolt of this kind. The bolts shown have shanks or bodies 45 provided with upper screw threaded portions 47, for cooperation with the nut 20. Each of the flat faces of the shank portions 45 is provided with a half groove 48 therein, the two half grooves being slightly spaced from the center of the two halves of the bolt. These half grooves may be substantially semi-cylindrical in form or may be slightly tapered, as shown, and when the two halves of the bolt are positioned in operative relation to each other, the half grooves will be slightly out of registration with each other. A pin or nail 50 may then be driven into the open ends of the half grooves. This pin will tend to move the grooves into alinement with each other and in doing so, will force the two half shanks 45 to shift slightly along their flat faces, as indicated in a greatly exaggerated manner in Figs. 9 and 10, thus causing portions of the threads 47 of the bolt to become wedged or forced into the threads of the nut 20, to resist removal of the nut from the bolt. Furthermore, if the lower ends of the shanks 45 adjacent to the nut remain substantially in their original positions, the two halves of the shank of the bolt at the threaded end thereof will tend to swing apart when the pin or nail 50 is driven into the half recesses, thus spreading the upper ends of the threaded portions of these halves farther apart than the other ends thereof, which would further resist the removal of the nut from the bolt. Upon removal of the pin or nail 50, the nut 20 may be easily removed from the bolt.

Figure 11:
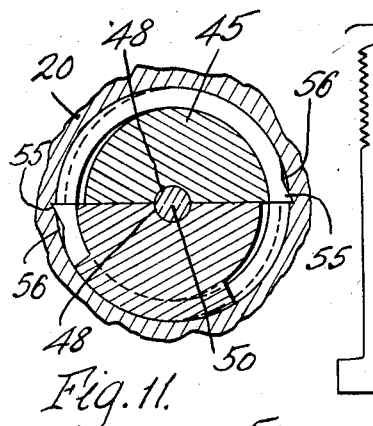
Fig. 11 is a sectional view thereof on line 11—11, Fig. 9.

The construction shown in Figs. 9 and 10 may be used for forming a permanent connection between the nut and the bolt so that the same may be used in place of a rivet to permanently connect two parts. When this is desired, it is preferable to form portions of the threads of the two parts of the nut so that they tend to cut or penetrate into the nut. I have illustrated in Fig. 11 how this can be accomplished by means of threads pressed into the two halves or parts of the bolt by means of dies. These threads are formed at one side of a half bolt with acute angled ends 55 which project outwardly from the center of the bolt to a slightly greater extent than other portions of the threads. If desired, the portions of the threads adjacent to the projecting ends 55 may be recessed as shown at 56, thus forming these ends of the threads substantially into the shape of cutters. The other end portions of the threads of the half bolts are preferably of slightly smaller radius than the radius of other portions of the threads to compensate for the extent to which the ends 55 of the threads project outwardly. Consequently, when a nut is applied and tightened on a bolt, the projection 55 offers no resistance to the turning of the nut. After the two half bolts are moved crosswise on their flat faces, by driving a pin or nail 50 into the half recesses in the ends of the half bolts, the projections 55 of the threads are driven into the metal of the nut, as clearly shown in Fig. 11. Consequently, the unscrewing of the nut by turning the same in a counterclockwise direction in Fig. 11 will be positively prevented.

The nut securing devices shown in Figs. 8 to 11 inclusive may be used in connection with either a single or double lead thread and are particularly desirable in conjunction with a double lead thread, since with the latter type of thread, a nut may more easily become loosened on the bolt.

By means of the construction described, each half of the bolt may be separately inserted through the narrow portion C of a T-slot in a plate so that it is not necessary in connection with my improved bolt to position the bolt in the slot by moving the same lengthwise thereof from one open end and it is also unnecessary to provide T-slots with enlargements in the narrow portion C thereof at intervals, which enlargements tend to weaken the plate A. Consequently, if two or more articles D are clamped on a plate A and it is desired to clamp another article between these two, it is not necessary to remove either of the two articles from the plate, since the two halves of the bolt may be inserted separately through the narrow portion C of the slot between the two first mentioned articles so that the third article may be positioned and secured on the plate between the first two articles.

The bolts herein shown have approximately the same strength as bolts made of a single piece of metal and the heads of my improved bolts have the same amount of bearing surface on the underfaces of the T-slots as do single piece bolts, so that my improved bolts are just as resistant to damage either to themselves or to the grooved plate, as are the single piece bolts heretofore used.

The strength of these bolts is also due to a large extent to the fact that the two parts of the bolt, when in operative position, lie in contact with each other throughout their length, particularly at the head of the bolt. This serves to maintain the two parts of the head in their correct positions when subjected to strains and prevents the bending of the head parts toward each other, as would be the case if the head parts were normally separated or spaced apart.

I claim as my invention:

1. A bolt for use with an undercut slot of substantially T-shaped cross section, one end of said bolt being threaded to cooperate with a nut and the other end being provided with a square head adapted to enter into the undercut portion of said slot, said bolt, including said head, being formed of two parts divided lengthwise and substantially axially of said bolt along a plane extending substantially parallel to two opposite sides of said square head and providing said parts of said bolt with contact surfaces along which said parts contact throughout their length when in operative relation to each other in said slot with said contact surfaces exending lengthwise of said slot, said head parts of said bolt contacting with each other substantially throughout their contact surfaces to resist the tendency of said head parts to bend when the bolt is under tension, the head portion of each bolt part being of a size to permit it to be passed through the narrow portion of said slot in said plate when said surface is substantially parallel to said slot, said two parts of said bolt being movable into operative relation to each other lengthwise of said slot with said parts of said head portions extending into the larger and undercut portions of said slot.

2. A bolt for cooperation with an undercut slot of substantially T-shaped cross section, one end of said bolt being threaded to cooperate with a nut and the other end being provided with a head adapted to engage in said slot and means for holding said bolt against turning in said slot, said bolt and head being formed in two parts divided lengthwise along an axial plane of said bolt to form surfaces along which the two parts of said bolt contact when in operative relation to each other, said contact surfaces extending throughout the length of said bolt including said head to resist the tendency of said head parts to bend when said bolt is subjected to tension, the inner face of the head of a half bolt being slightly inclined from a plane extending perpendicularly to the axis of the bolt, whereby, upon applying tension to the bolt, said inclined face tends to swing one bolt part out of registration with the other bolt part to cause the threaded portions of said bolt to grip said nut to prevent turning of the same in a direction to move from the bolt.

3. A bolt for cooperation with an undercut slot of substantially T-shaped cross section, one end of said bolt being threaded to cooperate with a nut and the other end being provided with a head adapted to engage in said slot, and means for holding said bolt against turning in said slot, said bolt and head being divided into two halves along substantially flat contact surfaces extending in an axial plane of the bolt parallel with the T-shaped slot, said halves each having a longitudinally extending groove formed in the middle portion of the flat faces thereof, and extending inwardly from the threaded end of said bolt, said grooves in the two half bolts being slightly offset laterally relatively to each other, and a pin which when driven into said grooves, tends to move said half bolts laterally relatively to each other along their flat surfaces to grip said nut.

4. A bolt according to claim 3 characterized in that portions of the threads terminating at said contact surfaces of said bolt parts have acute angled outwardly projecting parts which permit the nut to turn freely in a direction to tighten the bolt and which penetrate the nut to resist turning of the same when said pin is driven into said grooves.

GEORGE F. WALES.